United States Patent [19]
Creed et al.

[11] Patent Number: 6,082,252
[45] Date of Patent: Jul. 4, 2000

[54] PRE-HEAT APPARATUS FOR PEELING SYSTEM

[75] Inventors: Sherman Howell Creed; Rey A. Elizondo; Robert Leland Frenkel, all of Fresno, Calif.

[73] Assignee: FMC Corporation, Chicago, Ill.

[21] Appl. No.: 09/342,970

[22] Filed: Jun. 29, 1999

[51] Int. Cl.[7] .............................. A23N 7/00; A23N 7/02; A23N 7/10
[52] U.S. Cl. ................................. 99/483; 99/487; 99/516; 99/534; 99/584; 99/623
[58] Field of Search ........................... 99/451, 467–476, 99/483, 484, 487, 516, 534, 535, 584, 588, 623–630; 426/287, 288, 442, 479–483

[56] References Cited

U.S. PATENT DOCUMENTS

| | | | |
|---|---|---|---|
| 3,602,282 | 8/1971 | Hirahara | 426/287 |
| 3,854,395 | 12/1974 | Hirahara | 99/630 |
| 4,023,477 | 5/1977 | Hirahara et al. | 99/585 |
| 4,062,985 | 12/1977 | Amstad | 426/483 |
| 4,132,162 | 1/1979 | Magnuson | 99/516 X |
| 4,230,034 | 10/1980 | Amstad | 99/587 |
| 4,237,782 | 12/1980 | Bichel | 99/625 |
| 4,519,305 | 5/1985 | Vanosdall | 99/625 |
| 4,831,922 | 5/1989 | Cogan et al. | 99/486 |
| 4,842,883 | 6/1989 | Amstad | 426/483 |
| 5,033,372 | 7/1991 | Silvestrini | 99/625 |
| 5,106,641 | 4/1992 | Bichel | 99/516 X |
| 5,351,610 | 10/1994 | Jonsson | 99/623 X |

OTHER PUBLICATIONS

FMC FoodTech "Tomato Peeler Model CA–30" brochure, Undated.

*Primary Examiner*—Timothy Simone
*Attorney, Agent, or Firm*—Flehr Hohbach Test Albritton & Herbert LLP

[57] ABSTRACT

A tomato lye applicator (10) including a pre-heat apparatus (14) mounted to the shell (16) of applicator (10) for pre-heating tomatoes prior to submerging in a lye solution bath (28). Pre-heat apparatus (14) includes a conveyor (42) and steam connections (64, 66) for heating enclosure (40) so that as tomatoes move from inlet (18) to applicator inlet (20), the skins of the tomatoes are pre-heated an amount sufficient to enhance skin loosening by the lye solution.

18 Claims, 5 Drawing Sheets

PRE-HEAT APPARATUS FOR PEELING SYSTEM

FIELD OF THE INVENTION

The present invention pertains to automated vegetable and fruit peeling systems and, more particularly, to tomato lye peeling systems.

BACKGROUND OF THE INVENTION

The assignee corporation of the present invention manufacturers and sells a tomato lye applicator under the model designation CA-50. FIG. 1 shows a schematic diagram of this lye applicator indicated by reference number 1. In operation, tomatoes are fed into conveyor buckets of the applicator just ahead of the bottom left sprocket 4, as indicated by arrow A, and are discharged from the lye applicator down a transfer chute 3, as indicated by arrow B, where the tomatoes move into skin removal machinery. At point A, the tomatoes enter the lye solution almost immediately. Reference number 5 shows the approximate level of the lye solution 7 in lye applicator 1. Prior to entry point A, the tomatoes are subject to the temperature of the applicator environment.

The present invention improves upon the tomato skin peeling process of the applicator of FIG. 1 by providing a pre-heat system prior to the lye solution, as disclosed herein.

SUMMARY OF THE INVENTION

Briefly described, the lye applicator of the present invention includes a lye solution bath for submerging of the product for a period of time, and an applicator conveyor for moving the product through the lye solution bath. The lye applicator conveyor includes an upper run before the lye solution bath and an applicator inlet positioned along the upper run of the applicator conveyor, through which product can be delivered into the lye applicator and onto the applicator conveyor. The upper run of the applicator conveyor between the applicator inlet to the lye solution bath has a length sufficient to provide enough pre-heating to the product to allow for one of reduced lye solution concentration and reduced time for submerging of the product.

According to an aspect of the invention, the lye applicator includes a source of additional pre-heating along the upper run of the applicator conveyor. Preferably, the source of additional pre-heating includes steam pipes.

According to another aspect of the invention, the applicator conveyor is positioned sufficiently below the applicator inlet so that product delivered into the applicator inlet falls onto the applicator conveyor in a manner creating agitation of the product, in order to enhance pre-heating.

According to another aspect of the invention, the upper run of the applicator conveyor is at least as long as half the length of the applicator conveyor through the lye solution bath.

According to another aspect of the invention, the lye applicator further comprises a pre-heat apparatus external of the lye applicator for pre-heating the product prior to entry into the lye applicator. Preferably, the pre-heat apparatus includes a heated enclosure through which the product moves prior to entry into the lye applicator.

According to another aspect of the invention, the heated enclosure includes a conveyor for moving the product. Preferably, the heated enclosure extends along a portion of the upper side of the lye applicator.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

In the drawings, like reference numerals refer to like parts throughout the several views, wherein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
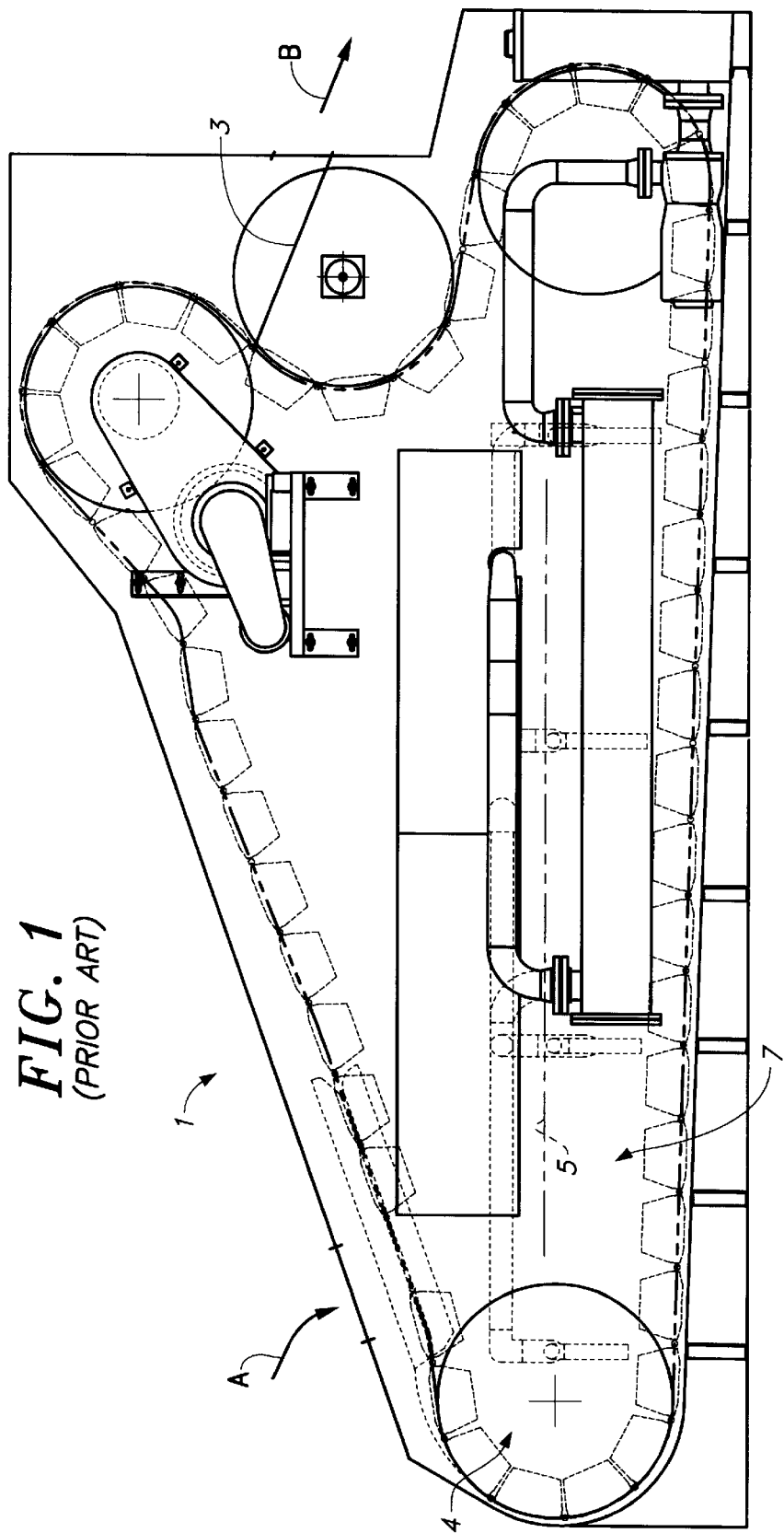
FIG. 1 is a schematic side elevation view of a prior art lye applicator.
Figure 2:
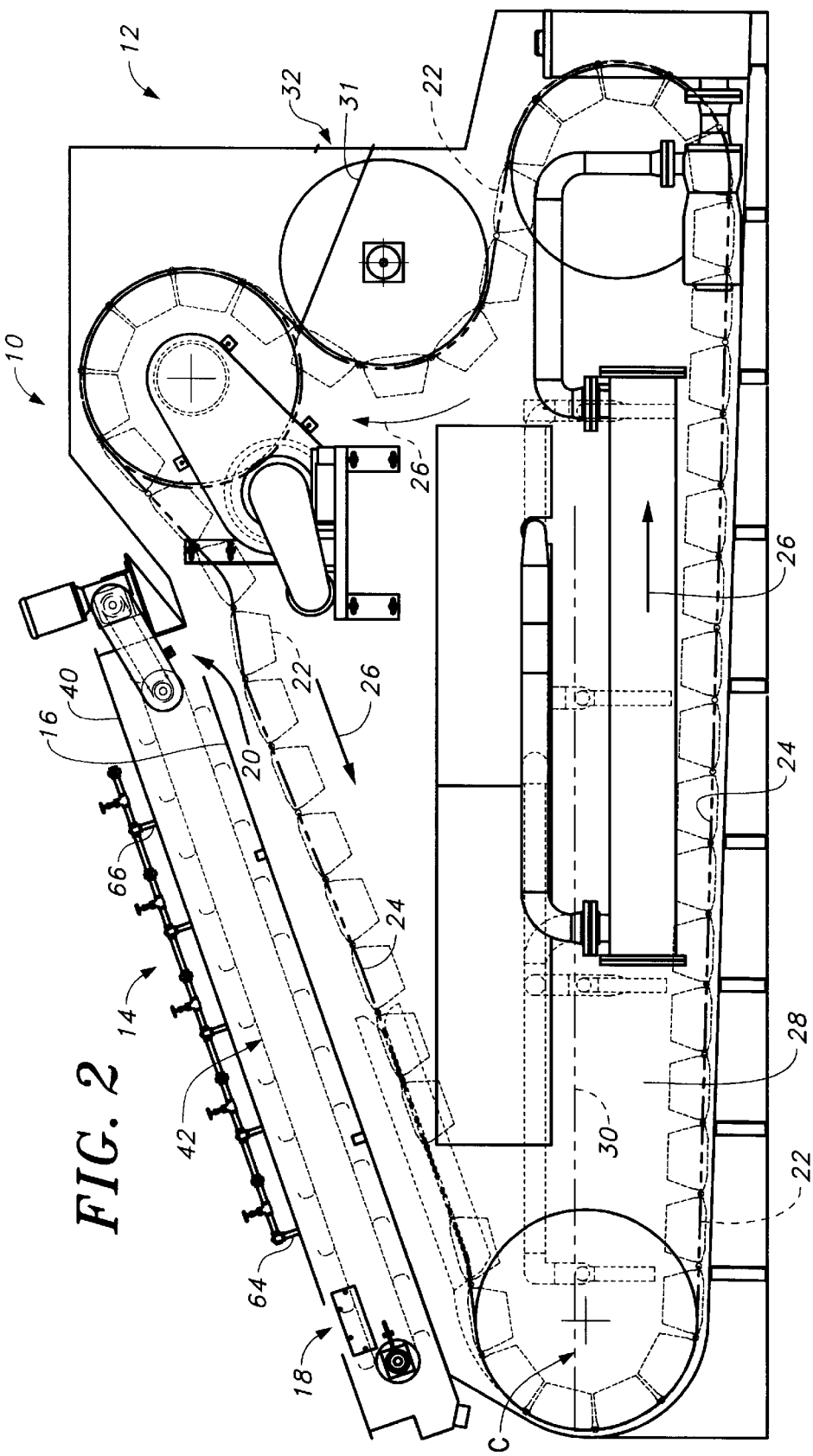
FIG. 2 is a schematic side elevation view of the lye applicator and pre-heat apparatus of the present invention.

Referring to FIG. 2, the lye applicator and pre-heat apparatus of the present invention is designated by reference numeral 10. Apparatus 10 includes a modified CA-50 lye applicator 12 manufactured and sold by Food Machinery Corporation of Chicago, Ill., U.S.A. The CA-50 lye applicator is discussed in more detail in copending application Ser. No. 09/322,135, entitled "Lye Recovery System," filed May 28, 1999. Provided with lye applicator 12 is a pre-heat apparatus 14, which is mounted on top of the shell 16 of lye applicator 12. Pre-heat apparatus 14 covers the inlet opening otherwise provided in shell 16 and includes, in replacement thereof, an inlet opening 18 into which tomatoes or other produce or products are fed.

From pre-heat apparatus 14, tomatoes are fed through an applicator inlet 20 down into a series of moving conveyor buckets 22 (shown in phantom), which move along an endless conveyor path 24 in the direction of arrows 26.

From applicator inlet 20, buckets 22 carry the tomatoes along a portion of the upper run of the conveyor path until the buckets submerge the tomatoes at point C in lye solution 28, the level of which is indicated by reference number 30. From point C, the tomatoes are submerged for about 30 seconds in a lye solution bath of approximately 12–18% sodium hydroxide. The tomatoes then move up and are discharged down chute out of the lye applicator at outlet 32.

Figure 3:
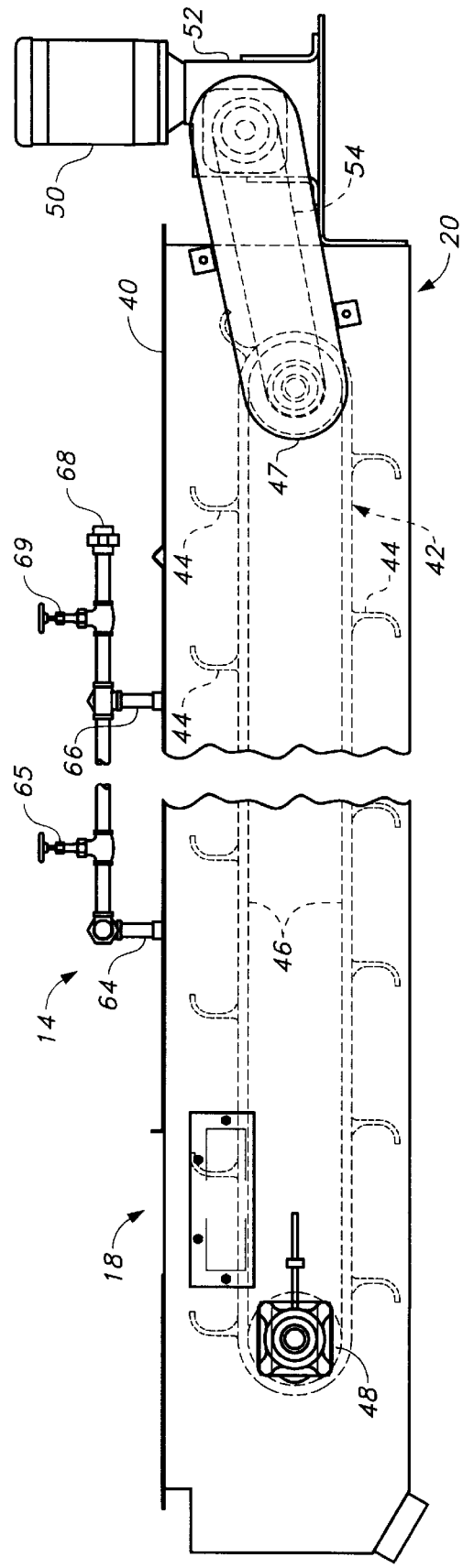
FIG. 3 is a side elevation view of the pre-heat apparatus of FIG. 2.

FIG. 3 shows an enlarged side elevation view of pre-heat apparatus 14, which includes a rectangular stainless steel shell 40 and an internal pre-heat conveyor 42. Shell 40 includes inlet opening 18 and outlet opening 20, which aligns and forms part of the applicator inlet. Conveyor 42 includes a series of scoops 44 carried by a conveyor chain 46, which is driven by a drive sprocket 47 and moves around a return sprocket 48. A variable speed motor 50, gear box 52 and drive belt 54 provide power to drive sprocket 46.

Figure 4:
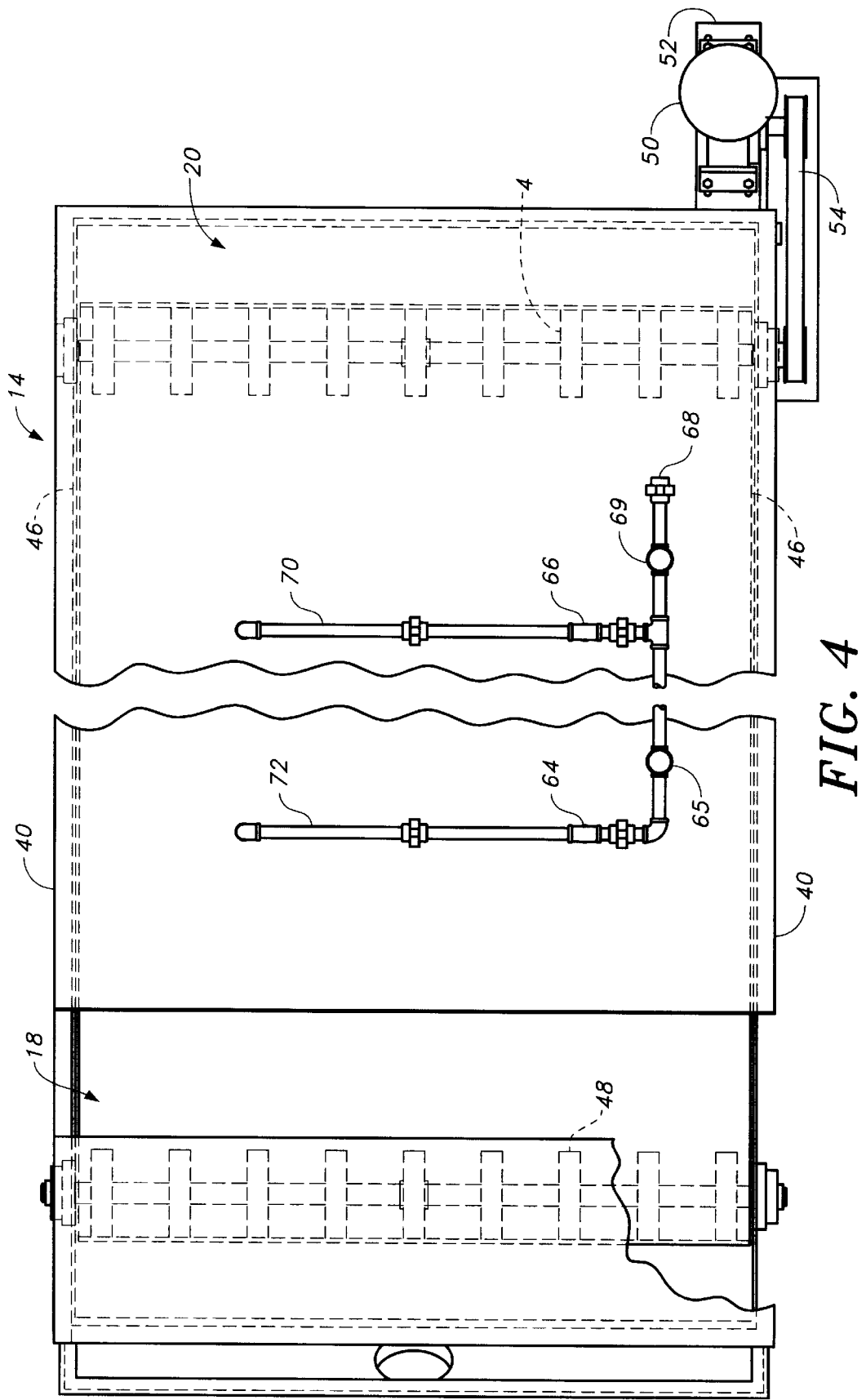
FIG. 4 is a plan view of the pre-heat apparatus of FIG. 2.

Steam connections 64, 66 with separate shut-off valves 65, 69 are coupled at 68 to a source of steam (not shown) and lead to internal transverse steam pipes 70, 72, shown in FIG. 4. Appropriate nozzles are coupled along the undersides of steam pipes 70, 72 in order to direct steam down onto the tomatoes as they move through the pre-heat apparatus toward opening 20. Shut-off valves 65, 69 allow for adjustment of the amount of pre-heat provided to the tomatoes.

Tests have shown that application of steam, as well as hot water and like heating means, prior to lye treatment improves peeling and can reduce the concentration of lye solution required to fully separate skins from the meat of tomatoes and can also reduce the length of time needed for submerging the tomatoes.

In addition to selective control of shut-off valves 65, 69, the length of pre-heat apparatus 14 can vary depending on the extent of pre-heat desired. Certain types of tomatoes or other produce may require more or less pre-heat to enhance peeling. The length of pre-heat apparatus 14 can also vary depending on the reduction of lye solution concentration achievable or desired as a result of pre-heating and also on the variations in exposure time of the tomatoes to lye solution. For example, it may be desired to reduce the lye concentration level due to peeling characteristics of the tomato skins, or it may be desired to increase thru-put of the peeling system, which would require reduced exposure times. Either way, increased pre-heating of the tomatoes may allow for both.

Figure 5:
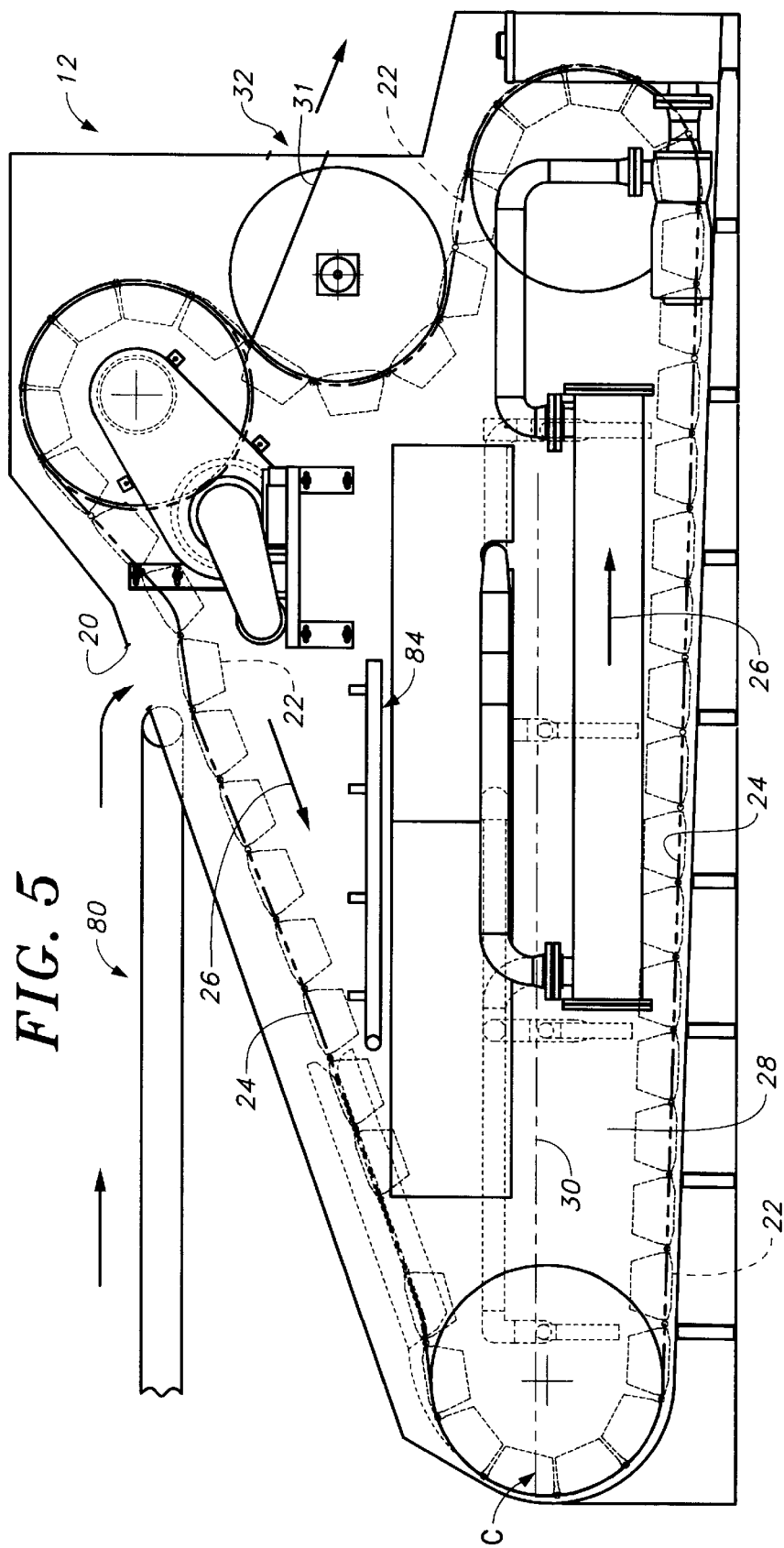
FIG. 5 is a schematic side elevation view of an alternative embodiment of the lye applicator and pre-heat apparatus of the present invention.

Referring to FIG. 5, an alternative embodiment of the present invention includes a lye applicator 12 and a delivery conveyor 80. The pre-heat apparatus shown in FIG. 2 is removed. Lye applicator 12 is similar to that of FIG. 2, but has been modified with the provision of an optional pre-heat steam pipe system 84.

For some applications, the elevated temperature and steam environment of the interior of lye applicator 12 may be sufficient to provide enough pre-heating to the tomatoes to achieve the benefits of the pre-heat apparatus of the first embodiment. By delivering tomatoes into buckets 22 at applicator inlet 20, the tomatoes travel along a portion of the upper run of the conveyor buckets, and from inlet 22 to point C, obtain a degree of pre-heating. Temperatures in the lye applicator can reach 212° F., and for some applications, this may be sufficient to provide desired heating, so long as the tomatoes are exposed to these elevated temperatures for a sufficient length of time prior to reaching the lye solution.

Should additional heating be needed, short of providing the pre-heat apparatus of the first embodiment, a source of additional pre-heating, such as steam pipes 84, can be provided along the upper run of the applicator conveyor below the buckets, in order to elevate the environment along the upper run of the conveyor. Steam pipes 84 may extend along a portion of or the entire length of the upper run between inlet 22 and point C, depending on the required amount of additional heating. It should also be noted that for both embodiments, transfer of the tomatoes from the infeed conveyor 80 (FIG. 5) or the pre-heat conveyor (FIG. 2) down into the conveyor buckets 22 causes a degree of agitation as the tomatoes fall onto conveyor buckets 22. This enhances pre-heating of the tomatoes because it allows the steam environment to better surround the skins of the tomatoes.

Preferably, the upper run of conveyor path 24 is at least as long as half the length of the applicator conveyor through lye solution bath 28.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A lye applicator for loosening skins of a product, comprising:

a lye solution bath for submerging of the product for a period of time, an applicator conveyor for moving the product through the lye solution bath, the applicator conveyor including an upper run before the lye solution bath, an applicator inlet positioned along the upper run of the applicator conveyor, through which product can be delivered into the lye applicator and onto the applicator conveyor, the upper run of the applicator conveyor between the applicator inlet to the lye solution bath having a length sufficient to provide enough pre-heating to the product to allow for one of reduced lye solution concentration and reduced time for submerging of the product.

2. The lye applicator of claim 1 wherein, the lye applicator includes a source of additional pre-heating along the upper run of the applicator conveyor.

3. The lye applicator of claim 2 wherein, the source of additional pre-heating includes steam pipes.

4. The lye applicator of claim 1 wherein, the applicator conveyor is positioned so that product delivered into the applicator inlet falls onto the applicator conveyor in a manner creating agitation of the product, in order to enhance pre-heating.

5. The lye applicator of claim 1 wherein, the upper run of the applicator conveyor is at least as long as half the length of the applicator conveyor through the lye solution bath.

6. The lye applicator of claim 1 and further comprising a pre-heat apparatus external of the lye applicator for pre-heating the product prior to entry into the lye applicator.

7. The lye applicator of claim 6 wherein, the pre-heat apparatus includes a heated enclosure through which the product moves prior to entry into the lye applicator.

8. The lye applicator of claim 7 wherein, the heated enclosure includes a conveyor for moving the product.

9. The lye applicator of claim 8 wherein, the heated enclosure extends along a portion of the upper side of the lye applicator.

10. A lye applicator for loosening skins of a product, comprising:

a lye solution bath for submerging of the product for a period of time, an applicator conveyor for moving the product through the lye solution bath, an applicator inlet positioned along the upper run of the applicator conveyor, through which product can be delivered into the lye applicator and onto the applicator conveyor, and a pre-heat apparatus external of the lye applicator for pre-heating the product prior to entry into the applicator inlet.

11. The lye applicator of claim 10 wherein, the pre-heat apparatus includes a heated enclosure through which the product moves prior to entry into the lye applicator.

12. The lye applicator of claim 11 wherein, the heated enclosure includes a conveyor for moving the product.

13. The lye applicator of claim 12 wherein, the heated enclosure extends along a portion of the upper side of the lye applicator.

14. The lye applicator of claim 10 and wherein, the applicator conveyor including an upper run before the lye solution bath, and the upper run of the applicator conveyor between the applicator inlet to the lye solution bath having a length sufficient to provide enough pre-heating to the product to allow for one of reduced lye solution concentration and reduced time for submerging of the product.

15. The lye applicator of claim 14 wherein, the lye applicator includes a source of additional pre-heating along the upper run of the applicator conveyor.

16. The lye applicator of claim 15 wherein, the source of additional pre-heating includes steam pipes.

17. The lye applicator of claim 16 wherein, the applicator conveyor is positioned sufficiently below the applicator inlet so that product delivered into the applicator inlet falls onto the applicator conveyor in a manner creating agitation of the product, in order to enhance pre-heating.

18. The lye applicator of claim 17 wherein, the upper run of the applicator conveyor is at least as long as half the length of the applicator conveyor through the lye solution bath.

* * * * *